United States Patent
Ulveling et al.

(10) Patent No.: US 6,610,243 B1
(45) Date of Patent: Aug. 26, 2003

(54) INSTALLATION FOR AQUEOUS GRANULATION

(75) Inventors: Léon Wurth Ulveling, Luxembourg-Howald (LU); Ernest Faber, Consdorf (LU); Robert G. Goffin, Caledonia (CA)

(73) Assignee: Paul Wurth S.A., Luxembourg ( * ) Notice: Subject to any disclaimer, the term of this patent is extended or adjusted under 35 U.S.C. 154(b) by 0 days.

(21) Appl. No.: 09/913,076

(22) PCT Filed: Feb. 8, 2000

(86) PCT No.: PCT/EP00/00985
§ 371 (c)(1),
(2), (4) Date: Oct. 9, 2001

(87) PCT Pub. No.: WO00/47316
PCT Pub. Date: Aug. 17, 2000

(30) Foreign Application Priority Data

Feb. 8, 1999 (LU) .................................................. 90346

(51) Int. Cl.[7] .............................................. C21B 3/08
(52) U.S. Cl. ...................................... 266/142; 422/172
(58) Field of Search .......................... 266/142; 422/172, 422/171, 170

(56) References Cited

U.S. PATENT DOCUMENTS

| 4,242,142 A | | 12/1980 | Gee et al. |
| 4,277,273 A | * | 7/1981 | Legille et al. .................. 65/19 |
| 5,540,895 A | * | 7/1996 | Faber et al. ................. 422/172 |

FOREIGN PATENT DOCUMENTS

| DE | 32 07 215 A1 | | 9/1983 |
| DE | 35 03 035 A1 | | 7/1986 |
| GB | 1 048 294 | | 2/1964 |
| WO | WO 00/00649 | * | 1/2000 |

* cited by examiner

Primary Examiner—Scott Kastler

(57) ABSTRACT

A granulation plant for aqueous granulation of a product includes a granulation tank fitted for the injection of granulation water in order to granulate the product. The granulation plant further includes a sedimentation tank, separate from the granulation tank, in which the granulated product settles in the form of granules, as well as a distributor to transfer the water/granule mixture from the granulation tank into the sedimentation tank.

16 Claims, 5 Drawing Sheets

INSTALLATION FOR AQUEOUS GRANULATION

FIELD OF THE INVENTION

This invention relates to an aqueous granulation plant.

BACKGROUND OF THE INVENTION

In aqueous granulation, the product for granulation (for example, molten slag, a molten alloy, copper matte) is placed in a powerful flow of water. This flow of water granulates, solidifies and cools the product. The granules are then removed from the granulation water.

Such aqueous granulation plants comprise a granulation tank fitted for injection of granulation water and also a device for removing the granules from the granulation water. A conventional granule removal device comprises a sedimentation tank, separate from the granulation tank, in which the granules settle.

SUMMARY OF THE INVENTION

The object of the present invention is the design of a simple granulation plant which facilitates granule removal. According to the invention this aim is attained by an aqueous granulation plant according to the present invention.

The aqueous granulation plant according to the invention comprises, in a recognised manner, a granulation tank fitted for injection of granulation water in order to granulate the molten product, a sedimentation tank separate from the granulation tank, in which the granulated product settles in granule form and a distributor to transfer the water/granule mixture from the granulation tank into the sedimentation tank. According to an important aspect of this invention, the sedimentation tank comprises a number of concentration tanks. It will be seen that when the water is fed into the sedimentation tank by the distributor, it is distributed among the various concentration tanks in which the granules settle according to their specific weight. Concentration of the granules in the concentration tanks according to their specific weight makes removal easier. Its modular design also enables the configuration of the sedimentation tank to be optimised for the product to be granulated.

In a preferred embodiment the sedimentation tank comprises a supporting structure and concentration tanks suspended from the supporting structure.

The concentration tanks are advantageously in the shape of a hopper with a horizontal top edge, allowing them to be suspended from the supporting structure. These edges are the only contact area between the supporting structure and the concentration tanks.

Two adjoining concentration tanks are advantageously arranged so that their top edges are adjacent. The water can then flow from one tank to the other over these adjacent top edges.

The sedimentation tank advantageously has a peripheral wall that rises above the top edges of the concentration tanks. This peripheral wall, however, comprises one or more overflow openings to allow the clarified granulation water to flow out of the sedimentation tank.

Partitions rising above the top edges can be erected between two concentration tanks. By means of such partitions, different paths can be defined for the water/granule mixture in the sedimentation tank. For example, a longer path can be arranged to favour settlement of fines.

The hopper-shaped concentration tanks advantageously discharge into a delivery pipe fitted with a sealing device. This enables either the material flow to be halted or the concentration tank to be emptied.

A water removal device may be fitted upstream of the sealing device. This water removal device comprises for example a filter sleeve separating a central duct from an annular water collecting chamber. The granulation water can thus be filtered by the filter sleeve and escape via the water collecting chamber, while the granules pass through the central duct after the sealing device opens.

In a first embodiment, the concentration tanks nearest to the distributor are connected to a draining drum. The granules that gather in these concentration tanks are discharged to the draining drum for separation of the granules from the granulation water.

The concentration tanks farthest from the distributor can then be connected to a hydrocyclone in order to extract the fines from the granulation water.

In a second embodiment, at least one conveyor is positioned underneath the concentration tanks to collect the said granules that gather in the said concentration tanks when the sealing devices are open, at least one said conveyor being for example fitted with a perforated belt to allow the granulation water to drain away.

BRIEF DESCRIPTION OF THE DRAWING

Further special features and characteristics of the invention will become clear from the detailed description of some advantageous embodiments which follows, by way of illustration, with reference to the drawings attached. These show:

FIG. 5 sectional view of a beam sideways on;

In the drawings the same reference numbers denote identical or similar components.

DETAILED DESCRIPTION OF THE PREFERRED EMBODIMENT

Figure 1:
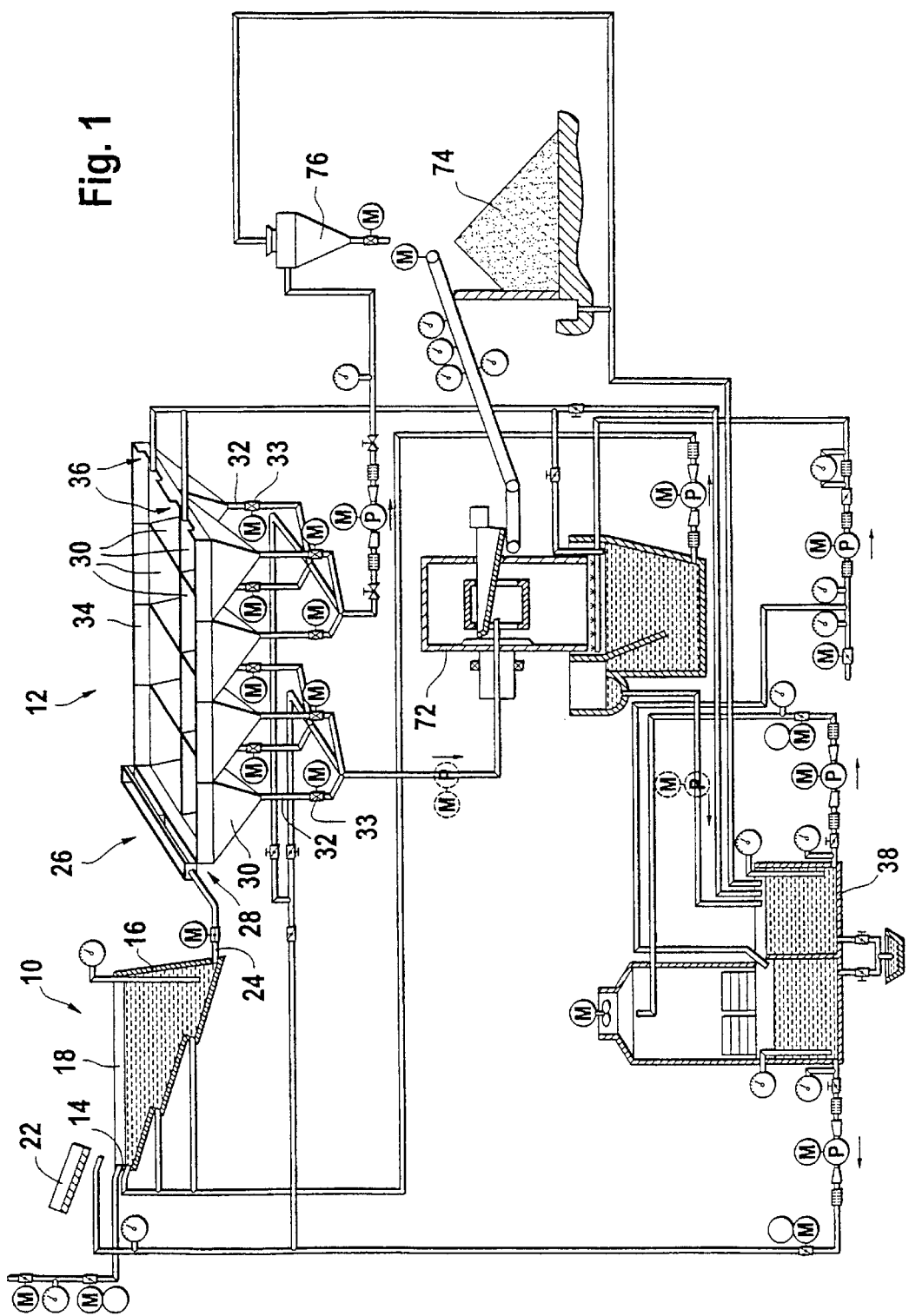
FIG. 1: synoptic illustration of an aqueous granulation plant with a draining drum and hydrocyclone.

FIG. 1 shows a plant for aqueous granulation of slag. This principally comprises a granulation tank 10 and a sedimentation tank 12 which is separate from the granulation tank 10.

The granulation tank 10 is an oblong-shaped tank having a front wall 14, a back wall 16 and two side walls 18 and 20. The bottom of the granulation tank 10 is stepped with sloping steps, the lowest step being in contact with the back wall 16. Slag is poured into the granulation tank 10 through a hot channel 22 located beside the front wall 14. The granulation tank 10 is fitted with means of injecting granulation water (not shown). The granulation water is injected at a rate of approximately 10 m/s. The quantity of water required is around 15 to 25 kg per kg of slag poured. In the granulation tank 10 the molten slag is carried along by the granulation water and is then granulated and solidified. The more turbulent the flow of water in the granulation tank 10, the less the risk of explosion due to release of hydrogen and superheated steam.

A pipe 24 carries the water/granule mixture from the granulation tank 10 to a distributor 26 which is arranged at one end 28 of the sedimentation tank 12. In the configuration shown in FIG. 1, this sedimentation tank 12 comprises two rows of four concentration tanks 30. These concentration tanks 30 are identical in dimensions and take the form of square-section hoppers. They discharge into a delivery pipe 32 fitted with a sealing device 33. A peripheral wall 34 rises above the top edges of the concentration tanks 30 to hold the liquid inside the sedimentation tank 12. Two overflow outlets 36 are provided in the shorter side farthest from the granulation tank 10.

Let us assume a water/granule mixture comprising granules of different sizes and densities, therefore distinguished by different weights. On clarifying such a mixture, the heaviest granules have the fastest settling rate and the lightest granules (fines, for example) have a very slow settling rate, remaining in suspension in the granulation water for a long time.

The water/granule mixture is fed in via the distributor 26 and the granules therefore have a horizontal rate due to the flow current in the sedimentation tank 12 as well as a vertical settling rate. The composition of these two rates causes the granules to be distributed in the concentration tanks 30. The granules with the fastest settling rate, in other words the heaviest, settle in the concentration tanks 30 nearest to the distributor 26. The lightest granules, on the other hand, settle in the concentration tanks 30 farthest from the distributor 26. The fines settle in the last of the concentration tanks. The clarified granulation water flows through the overflow holes 36 and is sent to a collecting tank 38. The content of the concentration tanks 30 in fact depends on the distance between them and the distributor 26. Likewise, the concentration tanks 30 that are the same distance from the distributor 26 will contain granules of similar particle size.

Figures 2, 3:
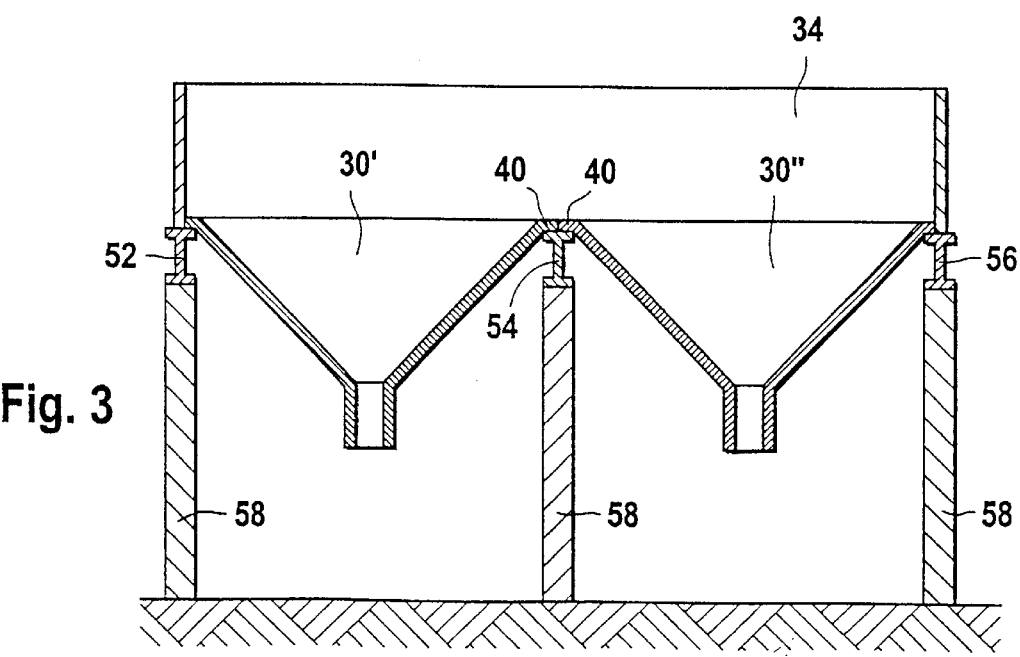
FIG. 2: sectional view of a concentration tank.
FIG. 3: view of a supporting structure.

At this point it is interesting to take a closer look at the characteristics of a concentration tank 30. FIG. 2 shows a sectional view of a concentration tank in the form of a square-section hopper through which the material flows into a delivery pipe 32. It will be seen that the concentration tank has horizontal top edges 40 allowing it to rest on a supporting structure (see FIG. 3). The delivery pipe 32 is fitted with a sealing device 33 which halts the passage of material in the delivery pipe 32. Upstream of this sealing device 33 the delivery pipe 32 is fitted with a water extraction device 42, equipped with a filter sleeve 44 and an annular water collecting chamber 46. The granulation water is filtered through the filter sleeve 44, which holds back the granules, before being discharged via the water collecting chamber 46. The granules can then flow through the delivery pipe 32 when the sealing device 33 is open. It will also be noted that a water injection device 48 is also included. This is a pipe discharging in two places in one of the walls of the concentration tank 30. It sometimes happens that granules which have gathered do not flow through the delivery pipe 32 when the sealing device 33 is open. A movement has to be initiated in the heap of granules to set the flow in motion. This is the purpose of the water injection device 48, which gets the heap of granules moving by injecting water into the concentration tank 30 in the direction of the arrow 50 to enable the concentration tank 30 to be emptied.

FIG. 3 shows a preferred embodiment of a supporting structure. The rows are delimited by three horizontal beams 52, 54 and 56, the same distance apart, supported by pillars 58. The concentration tanks 30' and 30" (similar to the concentration tank 30 in FIG. 3) can slide within a row defined by 2 beams (52, 54; 54, 56). This is an advantage of such a supporting structure, which readily allows the size of the sedimentation tank 12 to be altered. The presence of the peripheral wall 34 may also be noted.

Figure 4:
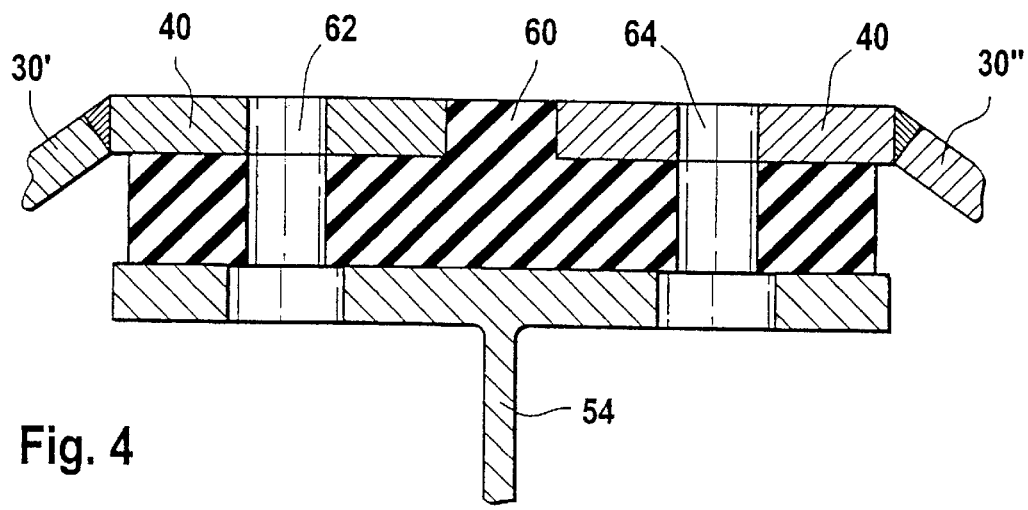
FIG. 4: sectional view of a beam supporting two concentration tanks.

FIG. 4 shows a preferred method of fastening the two concentration tanks 30' and 30" in FIG. 3. The top flange of the beam 54 is covered by a thick rubber cushion 60. The top edges 40 of the two concentration tanks 30' and 30" rest on the cushion 60. Care has been taken to allow a space between the adjacent top edges 40, which is filled with rubber. Holes 62, 64 serve to fasten the top edges 40 of the concentration tanks 30' and 30" firmly to the flange of the beam 54 by means of screws and bolts (not shown).

Figure 5:
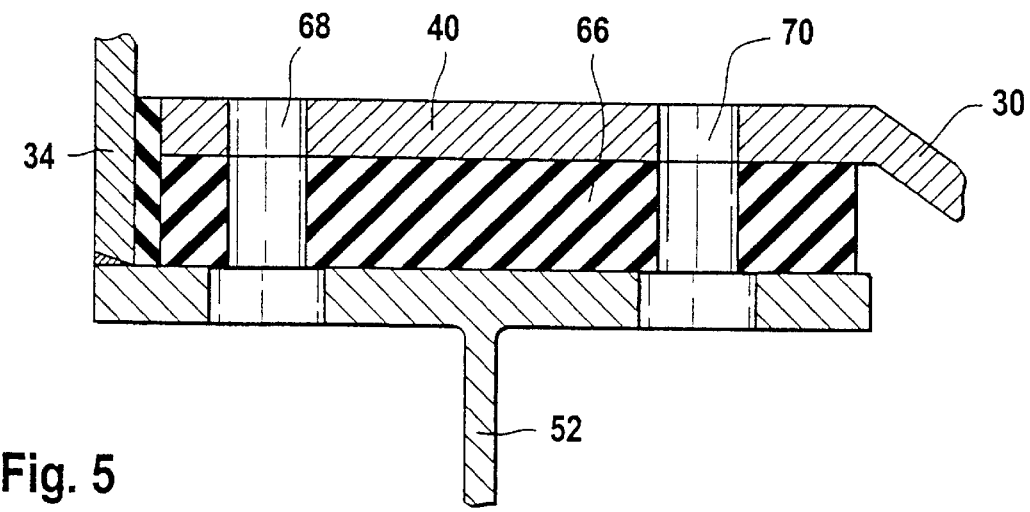

FIG. 5 shows a preferred method of fastening a concentration tank 30 to the exterior beam 52. One top edge 40 of a concentration tank 30 rests virtually on the whole surface of the top flange of the beam 52. A rubber cushion 66 is inserted between the web of the beam 52 and the top edge 40. Two holes 68, 70 are made to enable the concentration tank 30 to be fastened to the beam 52. The peripheral wall 34 is welded perpendicular to the top flange of the beam 52. Care has been taken to allow a space between the peripheral wall 34 and the top edge 40. This space is filled with rubber.

In FIG. 1, the delivery pipes 32 are not fitted with water extraction devices 42, but only with sealing devices 33. Downstream of these sealing devices 33, the first four concentration tanks 30, in other words those arranged nearest to the distributor 26, are connected to a draining drum 72. The granulation water recovered from the draining drum 72 is sent to the collecting tank 38; the drained granules are sent to a pile 74. The last four concentration tanks 30 are connected to a hydrocyclone 76, to separate the finest granules from the granulation water. The water is sent to the collecting tank 38 and the granules are sent to the pile 74.

Figure 6:
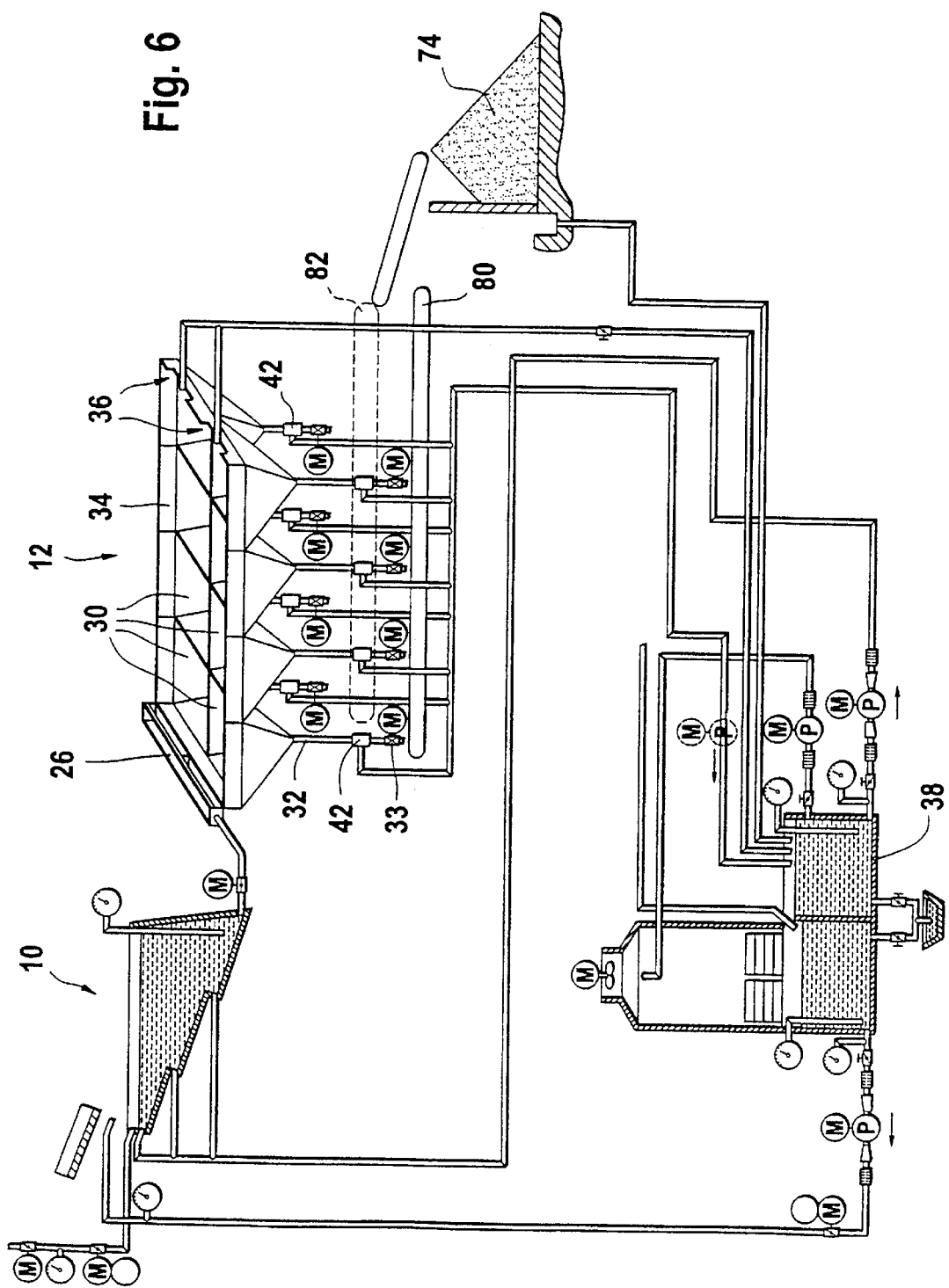
FIG. 6: synoptic illustration of an aqueous granulation plant with conveyor.

Another possibility for draining the concentration tanks is illustrated in FIG. 6. A filtering belt conveyor 80, 82 has been arranged underneath each row of concentration tanks 30. A water extraction device 42 with a filter sleeve 44 and water collecting chamber 46 is installed upstream of each sealing device 33, according to FIG. 2. The granulation water in the concentration tanks 30 is removed by the water extraction device 42. The sealing device 33 is then opened to allow the granules to drop on to the conveyor 80, 82. The granules removed are sent directly to the pile 74. It will be noted that the granulation water flowing through the overflow holes 36 or filtered through the filter sleeves 44 is collected in the collecting tank 38.

Figure 7:
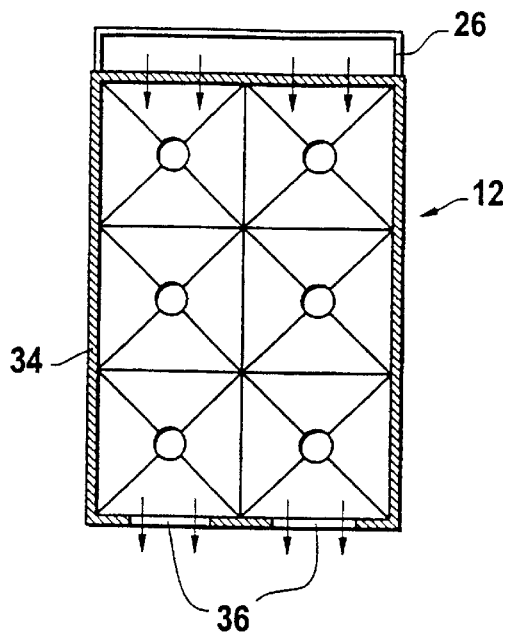
FIGS. 7, 8, 9 and 10: views of different sedimentation tanks.
Figure 8:
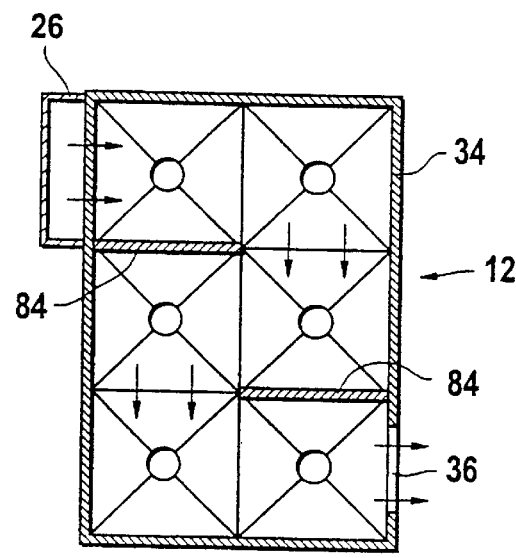
Figure 9:
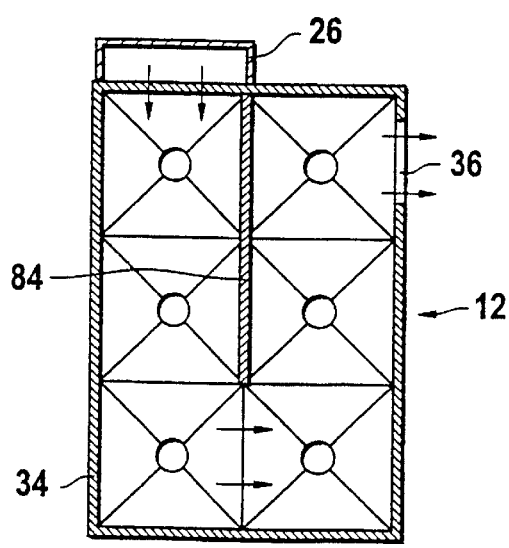

FIGS. 7, 8 and 9 show three embodiments of sedimentation tanks 12 which can readily be implemented in a supporting structure that has 3 beams, as shown in FIG. 3.

FIG. 7 shows a sedimentation tank 12 similar to that in FIGS. 1 and 6. The peripheral wall 34 has two overflow holes 36. The water/granule mixture is fed in via a distributor 26 across the whole width of the sedimentation tank 12 at one end, and the overflow holes 36 are located at the opposite end. The length of the path followed by the mixture in the sedimentation tank 12 is the same as the length of the tank.

In FIG. 8, the distributor 26 and the overflow hole 36 are diagonally opposite each other. Partitions 84 have been arranged to define a zigzag path through the sedimentation tank 12. The length of the path followed by the mixture is twice the length of the sedimentation tank 12.

In FIG. 9, the distributor 26 and the overflow hole 36 are in the upper part of the sedimentation tank 12. The partitions 84 are arranged so as to define a U-shaped path through the sedimentation tank 12. The distance covered by the mixture is likewise twice the length of the sedimentation tank 12.

It can thus be seen that by means of the partitions 84 the distance travelled by the mixture in the sedimentation tank 12 can be increased, so facilitating the settling of small granules.

Obviously, the number of concentration tanks 30, the number of rows and the number of partitions 84 can be altered to obtain various configurations. It will thus be understood that the modular design of the sedimentation tank 12 enables the path travelled by the water/granule mixture to be optimised according to the type of granules. The granules settle in the concentration tanks 30 according to their specific weight and are thus directly sorted during sedimentation, thereby saving on a subsequent sorting stage. Moreover, the use of identical concentration tanks 30, which can be slotted anywhere into the supporting structure, allows the configuration of the sedimentation tank 12 to be changed easily and quickly. It is also to be noted that the latter can contain concentration tanks of different shapes. However, in order to preserve the modular properties of the sedimentation tank, it is preferable to use removable concentration tanks of standardised shape, which slot into an appropriate supporting structure. The concentration tanks will therefore preferably have simple exterior shapes (square or rectangular), allowing them to be fitted into the supporting structure.

Figure 10:
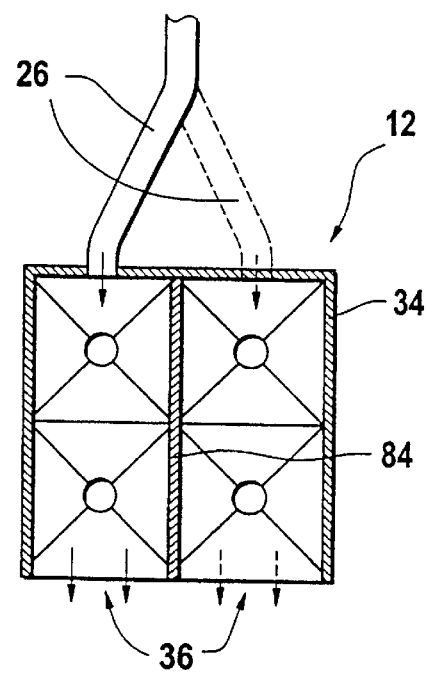

It is even possible to operate with a sedimentation tank divided into two autonomous sedimentation units. This is the configuration shown in FIG. 10. The tank comprises two rows of two concentration tanks 30 separated by a central partition 84. There is a peripheral wall 34 and each row has an overflow hole 36. By using a distributor 26 with a slewable duct, the water/granule mixture can be fed selectively into either row.

It will be noted that it is preferable to empty the concentration tanks 30 in sequence. This procedure has the advantage of enabling any concentration tanks 30 that are blocked to be located. The concentration tanks 30 nearest to the distributor 26 will generally have to be emptied most often.

What is claimed is:

1. A granulation plant, comprising:
   a granulation tank;
   means for feeding a product to be granulated into said granulation tank;
   means for injecting granulation water into said granulation tank so as to granulate said product, wherein a water/granule mixture is formed in said granulation tank;
   a sedimentation tank separate from said granulation tank;
   a water/granule mixture transfer means for transferring said water/granule mixture from said granulation tank into said sedimentation tank;
   wherein said sedimentation tank comprises:
      a supporting structure; and
      a number of separate concentration tanks arranged in modular fashion within said supporting structure, so as to define for said water/granule mixture a given flow path through said separate concentration tanks.

2. The granulation plant according to claim 1, wherein said concentration tanks are in the shape of a hopper with a horizontal top edge, said horizontal top edge allowing them to be suspended from said supporting structure.

3. The granulation plant according to claim 2 wherein two adjoining concentration tanks have their horizontal top edges adjacent, so that said water/granule mixture can flow over said top edges from one concentration tank to the other.

4. The granulation plant according to claim 3, wherein said sedimentation tank further comprises:
   a peripheral wall rising above said horizontal top edges of said concentration tanks.

5. The granulation plant according to claim 4, wherein said sedimentation tank further comprises:
   at least one partition rising above the adjacent top edges of two adjoining concentration tanks, so that said water/granule mixture is prevented from flowing over said adjacent top edges.

6. The granulation plant according to claim 1, wherein said concentration tanks are in the form of a hopper comprising:
   a tapered bottom end;
   a delivery pipe connected to said tapered bottom end so said hopper discharges into said delivery pipe; and
   a sealing device fitted into to said delivery pipe.

7. The granulation plant according to claim 6, further comprising:
   a water extraction device fitted in said delivery pipe upstream of said sealing device.

8. The granulation plant according to claim 7, wherein said water extraction device comprises:
   a central duct;
   an annular water collecting chamber surrounding said central duct; and
   a filter sleeve separating said annular water collecting chamber from said central duct.

9. The granulation plant according to claim 1, wherein said water/granule mixture transfer means comprises a distributor arranged along one side of said sedimentation tank.

10. The granulation plant according to claim 9, wherein:
    said sedimentation tank has rectangular cross-section with a first side and an second side located opposite of said first side;
    said distributor is located along said first side and designed to feed said water/granule mixture across the whole width of said first side, and
    said sedimentation tank further comprises an overflow for clarified water across the whole width of said second side.

11. The granulation plant according to claim 9, further comprising:
    a draining drum, wherein the concentration tanks nearest to said distributor are connected to said draining drum, so that the granules gathering in these concentration tanks can be discharged to said draining drum.

12. The granulation plant according to claim 11, further comprising:
    a hydrocyclone, wherein the concentration tanks farthest from said distributor are connected to said hydrocyclone, so that the content of these concentration tanks can be discharged to said hydrocyclone.

13. The granulation plant according to claim 1, further comprising:
    a conveyor arranged underneath at least one of said concentration tanks; and
    discharging means for discharging the content of said at least one concentration tank onto said conveyor.

14. The granulation plant according to claim 1, wherein said sedimentation tank includes:
    at least two rows of adjoining concentration tanks; and
    partitions arranged between said concentration tanks, so as to define a zigzag flow path.

15. The granulation plant according to claim 1, wherein said sedimentation tank includes:
    at least two rows of adjoining concentration tanks;
    a partition arranged between said two rows, so as to define two parallel flow paths.

16. The granulation plant according to claim 15, wherein said water/granule mixture transfer means comprises:
    a distributor capable of selectively feeding said water/granule mixture into either row.

* * * * *

UNITED STATES PATENT AND TRADEMARK OFFICE
CERTIFICATE OF CORRECTION

PATENT NO. : 6,610,243 B1 Page 1 of 1
DATED : August 26, 2003
INVENTOR(S) : Léon Ulveling, Ernest Faber and Robert G. Goffin It is certified that error appears in the above-identified patent and that said Letters Patent is hereby corrected as shown below:

<u>Title page,</u>
Item [75], Inventors, between "Léon" and "Ulveling", please delete "Wurth".

Signed and Sealed this

Ninth Day of December, 2003

JAMES E. ROGAN
*Director of the United States Patent and Trademark Office*